Jan. 30, 1968  J. G. KAY  3,366,218
TRANSFER DEVICES
Filed Sept. 3, 1965  4 Sheets-Sheet 2
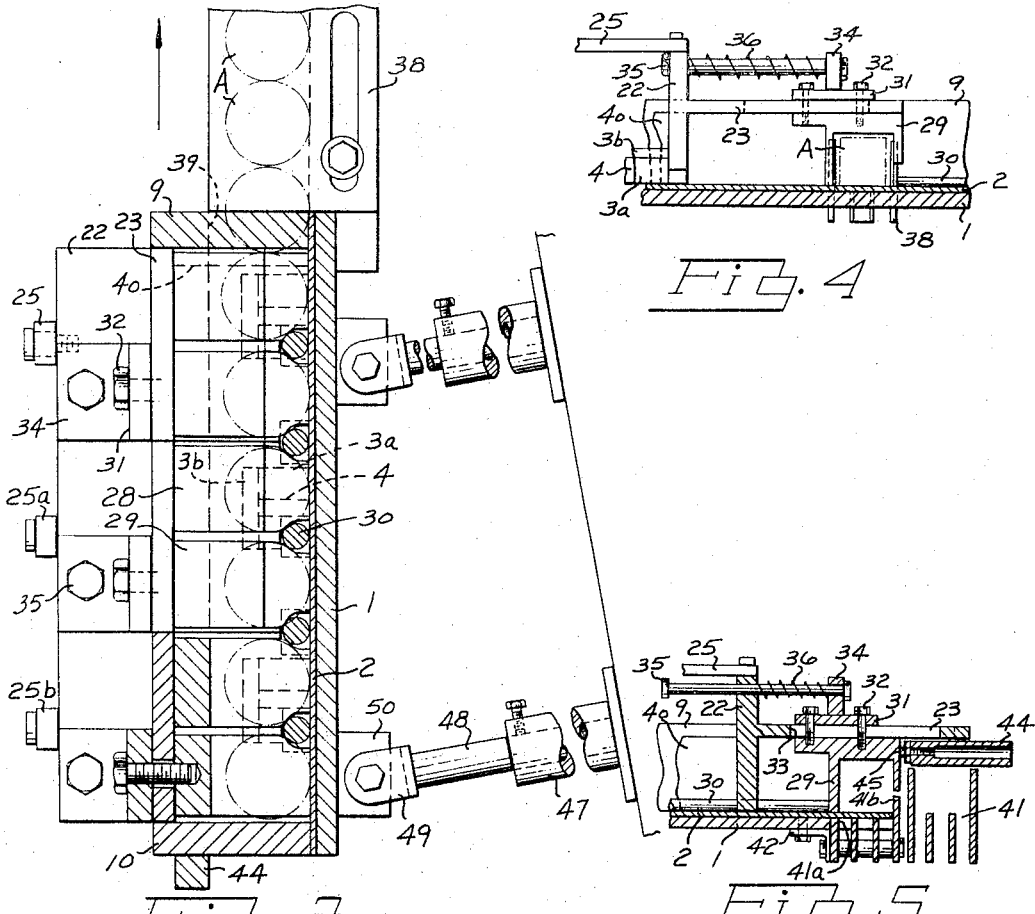
INVENTOR.
JOHN G. KAY
BY
Barnes, Kisselle, Raisch & Choate
Attorneys

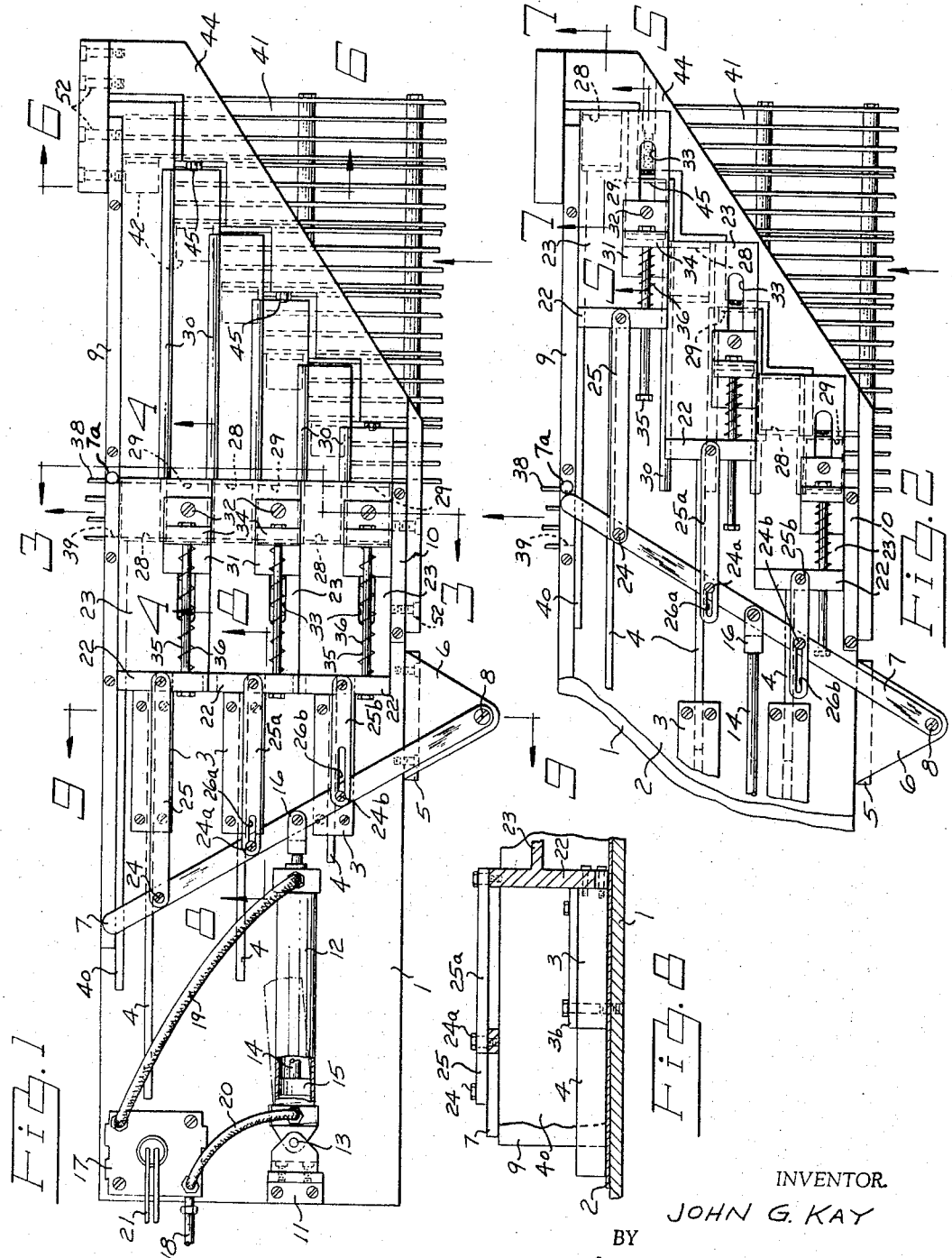

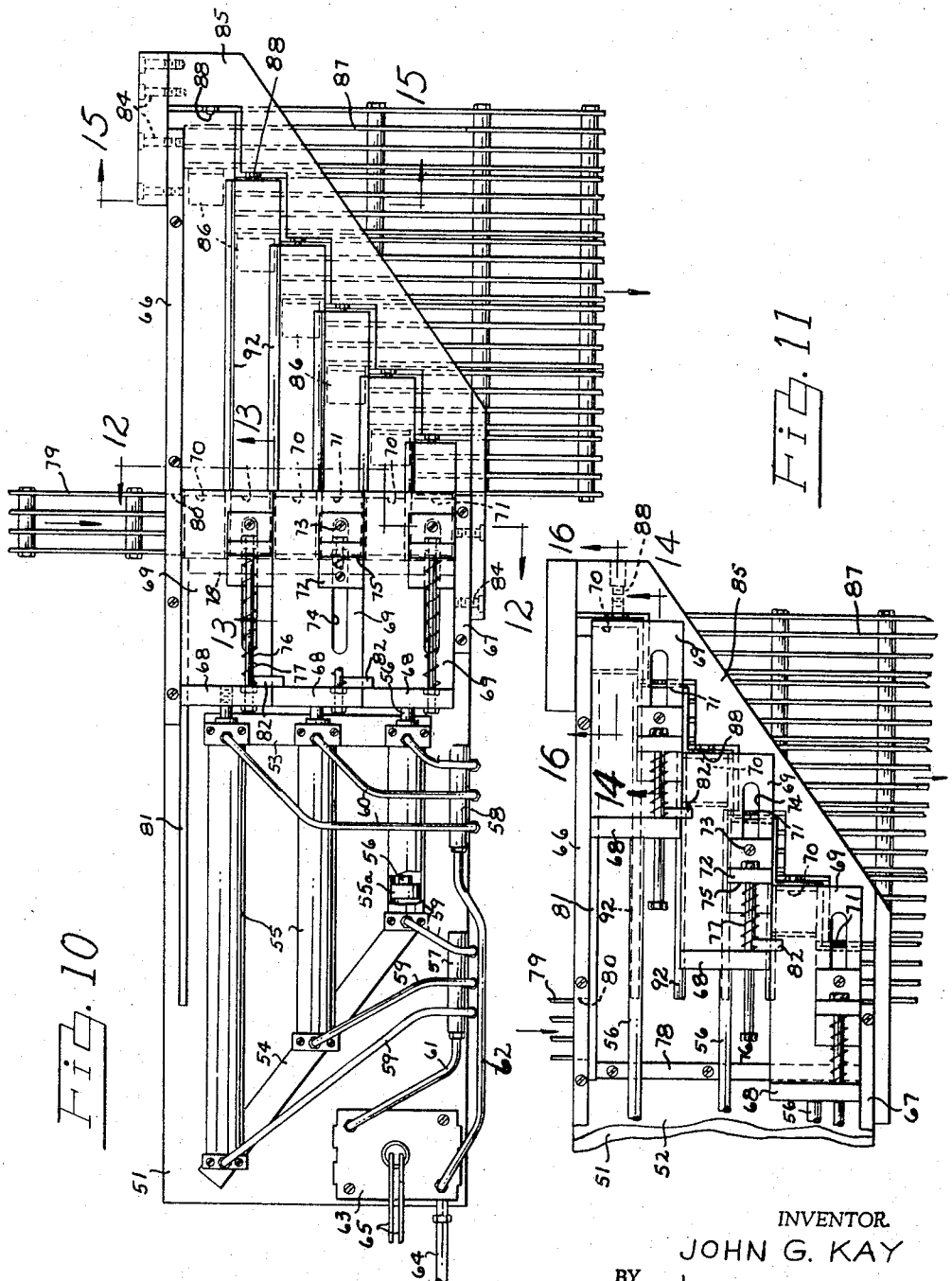

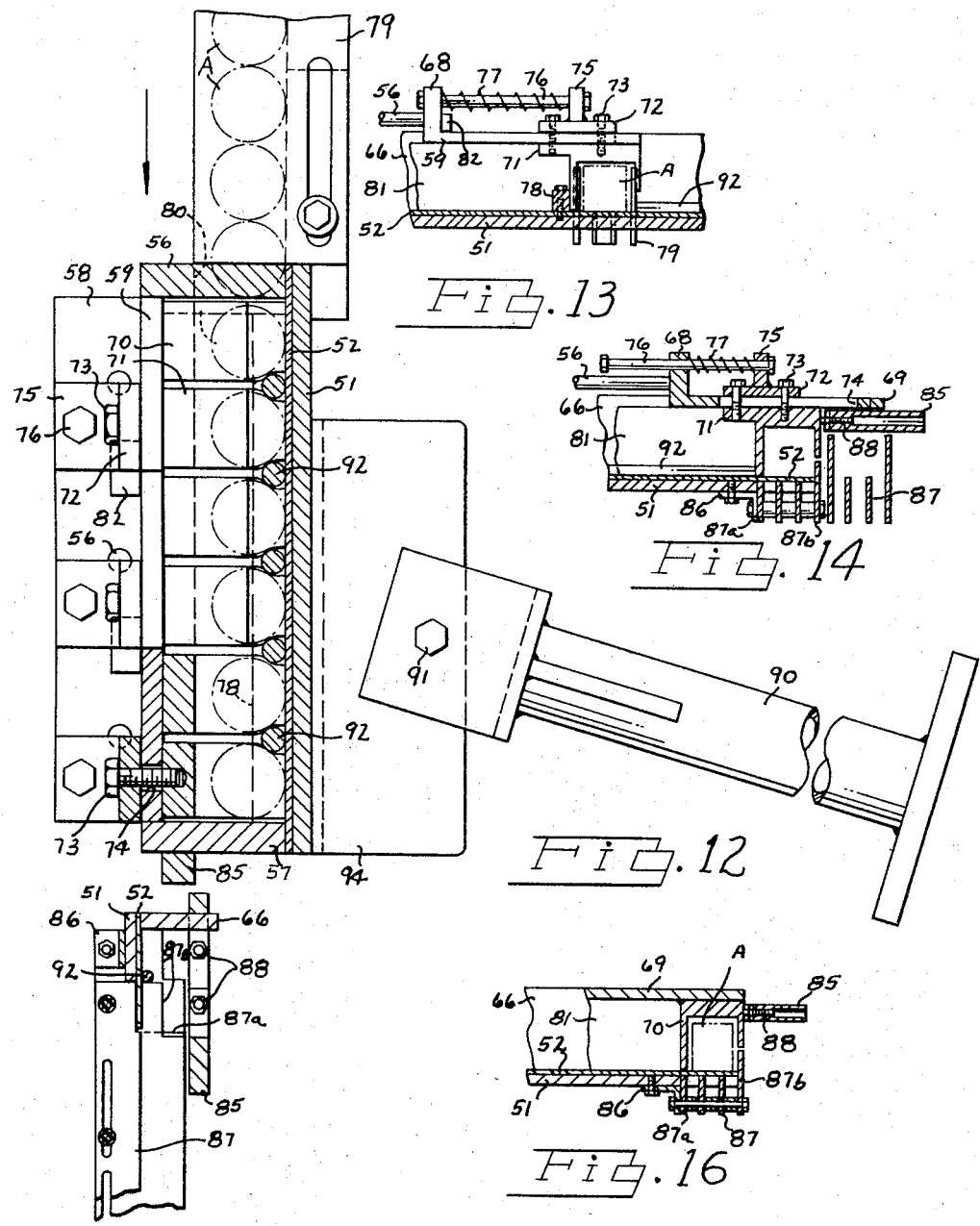

United States Patent Office 3,366,218
Patented Jan. 30, 1968

3,366,218
TRANSFER DEVICES
John G. Kay, Detroit, Mich., assignor to F. Jos. Lamb Company, Incorporated, Detroit, Mich., a corporation of Michigan
Continuation-in-part of applications Ser. No. 344,732 and Ser. No. 344,735, Feb. 13, 1964. This application Sept. 3, 1965, Ser. No. 489,792
5 Claims. (Cl. 198—24)

This is a continuation-in-part of application Serial No. 344,732 and Serial No. 344,735, filed Feburary 13, 1964, and now abandoned.

This invention relates to improvements in transfer devices.

It is an object of the invention to provide a transfer device for either distributing workpieces from a single conveyor uniformly to other conveyors, or for receiving workpieces simultaneously from other conveyors and discharging them onto a single conveyor.

Another object of the invention is to provide such a transfer device including a plurality of parallel slides mounted for reciprocation through different distances so that carriers mounted on them are transversely aligned with the single conveyor when the slides are retracted, and when the slides are advanced each carrier is positioned over one end of one of the other conveyors.

Another object of the invention is to provide such a transfer device wherein the other conveyors are parallel and have relatively stepped ends over each of which one of the carriers is positioned when advanced.

Another object of the invention is to provide such a transfer device wherein a plurality of carriers are mounted on each slide and are halted at their forward limits of travel in stepped relation to one another and over the correspondingly stepped ends of adjacent parallel conveyors which extend at right angles to the path of movement of the slides.

A further object of the invention is to provide such a transfer device with either a common or individual means for intermittently moving all the slides first in one direction and then in the other.

FIGURE 1 is a plan view showing the slides and their carriers retracted and the means for reciprocating all the slides;

FIGURE 2 is a partial plan view showing the slides and their carriers substantially in their advanced positions;

FIGURE 3 is an enlarged section on the line 3—3 of FIGURE 1;

FIGURE 4 is a section on the line 4—4 of FIGURE 1;

FIGURE 5 is a section on the line 5—5 of FIGURE 2 but with one movable carrier fully advanced;

FIGURE 6 is a section on the line 6—6 of FIGURE 1;

FIGURE 7 is a section on the line 7—7 of FIGURE 2 but with one carrier fixed on its slide in fully advanced position;

FIGURES 8 and 9 are sections on the lines 8—8 and 9—9 respectively of FIGURE 1;

FIGURE 10 is a plan view of a modification of the invention showing the slides and their carriers retracted to receive workpieces from the single conveyor and separate cylinders for moving the slides intermittently in one direction or the other;

FIGURE 11 is a partial plan view showing the slides and their carriers substantially in their advanced positions;

FIGURE 12 is an enlarged section on the line 12—12 of FIGURE 10;

FIGURE 13 is a section on the line 13—13 of FIGURE 10;

FIGURE 14 is a section on the line 14—14 of FIGURE 11 but with the movable carrier in its fully advanced position;

FIGURE 15 is a section on the line 15—15 of FIGURE 10, and

FIGURE 16 is a section on the line 16—16 of FIGURE 11 but with the slide and the carrier fixed thereon fully advanced.

Referring first to FIGS. 1–9, 1 designates a bed on which a hardened bearing plate 2 is preferably mounted. Secured longitudinally on the plate are parallel guides 3 each of which supports a sliding member 4 for reciprocation. Each guide member consists of two spaced parallel bars 3a between which one of the sliding members is mounted for reciprocation, and a cap 3b secured across the top of the bars prevents upward movement of the sliding member between them. Secured on one side of the bed 1 and projecting upwardly therefrom is a support 5 having an outwardly projecting flange 6 on which an arm 7 is pivotally mounted at 8 for movement about a vertical axis. Mounted along opposite sides of the bed 1 and projecting upwardly therefrom are guide rails 9 and 10 which are parallel with the sliding members 4. The arm 7 is also supported adjacent its outer extremity for movement by the outer face of the guide rail 9. Mounted also on the bearing plate 2 is a bracket 11 on which the rear extremity of a horizontal cylinder 12 is pivotally mounted for movement about a vertical axis. A piston rod 14 projects from a piston 15 in the cylinder and has a clevis 16 on its outer extremity. This clevis is pivotally secured to the arm 7 to reciprocate the latter intermittently through an arcuate path. Secured on the plate 2 is a solenoid operated 4-way valve 17 which is connected to a compressed air line 18; and 19 and 20 designate lengths of flexible tubing connecting the valve to the front and rear extremities of the cylinder. The valve is operated through an electrical connection 21 so that compressed air is admitted alternately and at predetermined intervals to each end of the cylinder.

Secured to the front extremity of each sliding member 4 is a vertical flange 22 which rides on the bearing plate 2. Integral with and projecting forwardly from each flange 22 is a slide 23 spaced above the said plate. The outer lateral outer margin of each outer slide 23 is adapted to be reciprocated against the inner face of one of the guide rails 9 or 10, and the lateral margins of the central slide 23 are longitudinally slidable contiguous to the inner faces of the outer slides.

Extending vertically through the arm 7 at different distances from its axis are a plurality of pivot pins 24, 24a and 24b. Pivotally mounted on the pin 24 farthest from the axis of the arm is the rear extremity of a link 25 the front extremity of which is pivotally attached to the flange 22 contiguous to the guide rail 9. The front extremity of a link 25b is pivotally attached to the flange 22 adjacent to the guide rail 10 and has a relatively long slot 26b formed longitudinally therethrough adjacent its rear extemity through which the pin 24b extends; and pivoted on the central flange 22 is the front extremity of a link 25a having a shorter longitudinal slot 26a therethrough adjacent its rear extremity through which the pin 24a passes. The stroke of the arm 7 is limited in one direction by the front faces of the guides 3 which engage the flanges 22 and in the other direction by a pin 7a projecting upwardly from the guide rail 9.

Dependingly mounted on each slide 23 and normally in transverse alignment are two carriers 28 and 29 each of which is substantially channel-shaped in cross-section (see FIGS. 5 and 7) so that its rear flange rides on the plate 2 and its front flange terminates somewhat above the said plate. Welded or otherwise suitably secured to the bearing plate 2 parallel with the path of movement of the carriers and intermediately of their length of travel are dividing strips 30 between each adjacent pair of which, and between each outer dividing strip and the guide rail 9 or 10 adjacent thereto, a path is defined along which one of the carriers 28 or 29 is intermittently reciprocated. One carrier 28 is fixed secured to each slide, and supported for longitudinal movement on each slide is a bracket 31. Screws 32 extending downwardly through each bracket pass through a longitudinal slot 33 in the slide beneath and dependingly support one of the carriers 29 for movement with the bracket. Projecting upwardly from each bracket is a flange 34 opposite and forwardly spaced from the flange 22 on the slide which supports it. Extending through each opposed pair of flanges 22 and 34 is a bolt 35 having a helical spring 36 thereon to urge the bracket forwardly and retain its carrier 29 in transverse alignment with the carrier 28 on that slide. Just before each slide reaches its forward limit of travel its carrier 29 is halted by means hereinafter described so that upon completion of forward movement of the slide its carrier 28 is in advance of its carrier 29. However upon commencement of the rear stroke of the slide the spring 36 returns the carrier 29 into transverse alignment with the carrier 28.

Suitably secured to one side of the bed 1 and projecting outwardly therefrom in transverse alignment with the carriers 28 and 29 when retracted is a single conveyor 38 which in the present instance consists of gravity chuting. Formed through the guide rail 9 adjacent and opposite the end of the conveyor 38 is an opening 39 through which workpieces A are adapted to flow in one direction or the other between the conveyor and the carriers. Mounted on and extending rearwardly from and flush with the face of the slide 23 adjacent the guide rail 9 is a closure plate 40 which in all advanced positions of the said slide prevents passage of workpieces through the opening 39.

Secured across the front of the bed 1 as by angle members 42 are the parallel extremities of a plurality of conveyors 41, each of which in the present instance consists of gravity chuting. These parallel extremities have relatively stepped ends each of which terminates across the front extremity of the path of travel of one of the carriers 28 or 29. As may be clearly seen in FIGURES 5 and 7 the sides of the conveyors 41 from which the carriers approach are cut down to the plate 2 for a short distance from their ends as shown at 41a, and the height of the opposite sides of the conveyors is reduced as shown at 41b so that the front depending flanges of the carriers 28 and 29 may advance into alignment with them.

The number of slides 23 and the number of carriers 28 and 29 on each slide depends upon the number of conveyors 41 being employed. It will also be noted that the path of movement of slides 23 is at right angles both to the conveyor 38 and the conveyors 41; and that the conveyor 38 usually projects from one side of the bed and the conveyors 41 from the other.

Extending over the front of the bed 1 and the extremities of the conveyors 41 supported thereby is a frame 44 which is secured to the guide rails 9 and 10 by screws 52. The rear face of the frame is rearwardly stepped to correspond with the relatively stepped ends of the conveyors 41. Projecting rearwardly through each stepped portion of the frame in front of one of the carriers 29 is a longitudinally adjustable stop 45 to halt the forward movement of one of the carriers.

The bed is supported so that it may be laterally downwardly inclined towards either side at the required inclination, to insure the desired speed of flow of workpieces in either direction between the carriers 28 and 29 and the conveyor 38. This arrangement is also advantageous for the conveyors 41, particularly when they consist of gravity chuting. In the present instance the supports for the bed consist of stands 47 upwardly from which vertically adjustable uprights 48 project, and mounted on the upper extremity of each upright is a clevis 49 which is pivotally secured to a flange 50 depending secured to the underside of the bed.

In the modification illustrated in FIGS. 10–16, 51 designates a bed on which a hardened bearing plate 52 is preferably secured. Mounted on the bed are suitable supports 53 and 54 on which the front and rear extremities, respectively, of a plurality of cylinders 55 are secured. The cylinders which are of progressively greater length from one side of the bed are longitudinally arranged thereon with their front extremities in transverse alignment. Pistons, one of which is shown at 55a, are mounted in the cylinders and have rods 56 projecting thereform. Mounted on the bed are two manifolds 57 and 58. The manifold 57 is connected to the rear extremities of the cylinders 55 by piping 59, and the manifold 58 is connected to the front extremities of the cylinders by other piping 60. Extending from the manifolds 57 and 58 are other pipe connections 61 and 62, respectively, both of which are connected to a solenoid-operated 4-way valve 63, mounted on the bed, to which fluid under pressure, in this case compressed air, flows through a supply line 64. 65 denotes an electrical connection for operating valve, which is of known construction and through which compressed air from the line 64 alternately at predetermined intervals flows through the manifold 57 or 58 to one end or the other of all the cylinders to move their piston rods substantially simultaneously in one direction or the other Guide rails 66 and 67 which are secured to and project upwardly from opposite sides of the bed extend forwardly from adjacent the front extremities of the cylinders parallel with their axes. Suitably secured on the front extremity of each piston rod 56 for reciprocation therewith is a flange 68 which is integral with a forwardly projecting slide 69. The width of the slides is such that the outer lateral margin of each outer slide is freely slidable along the inner face of the guide rail 66 or 67 adjacent thereto, and the opposite sides of the central slide are freely slidable along the inner lateral margins of the outer slides.

Dependingly mounted on each slide 69 and normally in transverse alignment are two carriers 70 and 71, each of which is of substantially channel section longitudinally of the path of movement of its slide so that its rear flange rides on the plate 52 while its front flange is preferably spaced somewhat above the latter as may be clearly seen in FIGURES 16 and 14. Welded or otherwise secured to the bearing plate 52 parallel with the path of movement of the carriers 70 and 71 and intermediately of their length of travel are spacing strips 92 between each adjacent pair of which and between each outer strip and the guide rail 66 or 67 adjacent thereto a path is defined along which one of the carriers 70 or 71 is intermittently reciprocated. A carrier 70 is fixedly secured to each of the slides. A bracket 72 is mounted for movement on each slide parallel with its path of movement. Screws 73 extending downwardly through each bracket pass through a longitudinal slot 74 through the slide beneath it and dependingly support one of the carriers 71. Projecting upwardly from each bracket 72 is a flange 75 opposite and forwardly spaced from the flange 68 on the slide 69 which supports it. Extending through each opposed pair of flanges 68 and 75 is a bolt 76 having a helical spring 77 thereon to urge the flange 75 and its bracket 72 forwardly and retain its carrier 71 in transverse alignment with the carrier 70 on that slide. Before each slide 69 reaches its forward limit of travel its carrier 71 is halted in a manner hereinafter described and the spring 77 becomes compressed as the slide and its carrier 70 complete their forward movement. However as each slide commences its rearward movement the spring 77 returns the carrier 71 thereon into alignment with the carrier 70.

Secured transversely on the bed 51 is a stop plate 78 (FIGURE 11) to halt the rearward movement of the carriers 70 and 71 and insure that they are all transversely aligned when fully retracted. Secured to the side of the bed 51 on which the guide rail 56 is mounted and in transverse alignment with all the carriers when retracted is one extremity of a single conveyor 79, which in this case consists of gravity chuting. Formed through the guide rail 66 opposite the adjacent end of the conveyor is an opening 80 for the passage of workpieces from the latter to the carriers. Mounted on and flush with the outer face of the slide 69 adjacent the opening 80 and projecting rearwardly therefrom is a closure plate 81 which prevents the passage of workpieces through the opening when the slide is advanced.

The length of stroke of the pistons 56 and their slides 69 decreases progressively from the piston and slide adjacent the guide rail 66. To insure that the slide adjacent the guide rail 67 having the shortest stroke and the central slide both reach their retracted positions at least as soon as the slide adjacent the guide rail 66, a lug 82 is secured to the flange 68 having the longest stroke and projects laterally in front of the flange on the central slide and another lug 82 is secured on the central flange 68 to project in front of the flange having the shortest stroke. Consequently the closure plate 81 cannot move rearwardly to expose the opening 80 for the admittance of workpieces A therethrough until carriers 70 and 71 are in alignment.

Secured across the front of the bed 51 as by angle members 86 are the parallel extremities of a plurality of conveyors 87 each of which in the present case consists of gravity chuting. These parallel extremities have relatively stepped ends each of which terminates across the front extremity of the path of travel of one of the carriers 70 or 71. As may be clearly seen in FIGURES 14 and 16 the sides of the conveyors 87 from which the carriers approach are cut down to the level of the plate 52 for a short distance from their ends as shown at 87a for the passage of the carriers thereover, and the height of the opposite sides of the conveyors 87 is reduced as shown at 87b so that the front depending flanges of the carriers may move forward into alignment with them.

The number of slides and the number of carriers on each slide depends upon the number of conveyors onto which workpieces are to be delivered. It will also be noted that the path of movement of the slides is at right angles both to the conveyor 79 and the conveyors 87, and that the conveyor 79 usually projects from one side of the bed and the conveyors 87 from the other.

Extending over the front of the bed and the extremities of the conveyors 87 supported thereby is a frame 85 which is secured to the guide rails 56 and 57 by screws 84. The rear faces of the frame are rearwardly stepped to correspond with the stepped ends of the conveyors 87. Projecting rearwardly through each stepped portion of the frame is a longitudinally adjustable stop 88 to halt the forward movement of one of the carriers 70 or 71 when it is positioned over the end of one of the conveyors 87 to deliver a workpiece thereonto.

The bed may be supported in any preferred manner between the conveyors 79 and 87. In the present instance longitudinally aligned legs 90 are each pivotally attached at 91 to a flange 94 projecting downwardly from the bed so that the latter may be supported at the desired transverse inclination to result in the desired speed of flow of workpieces from the conveyor 79 to the carriers if that conveyor consists of gravity chuting; and such transverse inclination is helpful when the conveyors 87 each consist of gravity chuting.

I claim:

1. A transfer device including a bed, a plurality of slides mounted for reciprocation on said bed along parallel paths, means for reciprocating all the slides intermittently first in one direction and then in the opposite direction and carriers mounted on said slides such that at one end of the stroke of the slides the carriers are aligned in a row extending transversely of their path of travel and at the opposite end of the stroke of the slides the carriers are in longitudinally stepped relation relative to their path of travel, said means for reciprocating the slides including a pivotally supported lever and means pivotally connecting each slide with said lever.

2. A transfer device including a bed, a plurality of slides mounted for reciprocation on said bed along parallel paths, means for reciprocating all the slides intermittently first in one direction and then in the opposite direction and carriers mounted on said slides such that at one end of the stroke of the slides the carriers are aligned in a row extending transversely of their path of travel and at the opposite end of the stroke of the slides the carriers are in longitudinally stepped relation relative to their path of travel, said means for reciprocating the slides including a pivotally supported lever, a link connecting each slide to said lever, said links being of progressively different lengths, and means for pivotally actuating said lever.

3. A transfer device including a bed, a plurality of slides mounted for reciprocation on said bed along parallel paths, means for reciprocating all the slides intermittently first in one direction and then in the opposite direction, carriers mounted on said slides such that at one end of the stroke of the slides the carriers are aligned in a row extending transversely of their path of travel and at the opposite end of the stroke of the slides the carriers are in longitudinally stepped relation relative to their path of travel, a conveyor aligned with said row of carriers at said one end of the stroke of the slides and a plurality of conveyors extending one from each carrier when the carriers are in said longitudinally stepped relation at said opposite end of the stroke of the slides, the length of the stroke of the slides decreasing progressively from one side of the bed to the other and means on each slide having a longer stroke for engaging the slide adjacent thereto and having a shorter stroke upon movement of the slides towards their limit of travel at said opposite end of the stroke such that all the shorter slides reach said limit of travel at least as soon as the slide having the longest stroke.

4. The combination called for in claim 3 wherein the last-mentioned means comprises a lug projecting laterally from each slide having a longer stroke and adapted to engage the slide adjacent thereto and having a shorter stroke.

5. A transfer device including a bed, a plurality of slides mounted for reciprocation on said bed along parallel paths, means for reciprocating all the slides intermittently first in one direction and then in the opposite direction, a plurality of carriers mounted on each of said slides such that at one end of the stroke of the slides the carriers are aligned in a row extending transversely of their path of travel and at the opposite end of the stroke of the slides the carriers are in longitudinally stepped relation relative to their path of travel, one of said plurality of carriers on each slide being fixedly mounted on the slide and another being mounted on the slide for movement in a path parallel to the path of travel of the slide, spring means normally retaining the movable carrier in transverse alignment with the fixed carrier, a stop on the bed for halting the movable carrier before the slide reaches said opposite end of its stroke whereby upon completion of movement of the slide the carriers are in said longitudinally stepped relation to one another.

References Cited

UNITED STATES PATENTS

| | | | |
|---|---|---|---|
| 1,791,153 | 2/1931 | Aldrich et al. | 198—31.A2 |
| 2,148,820 | 2/1939 | Kimball et al. | 53—165 X |
| 2,649,232 | 8/1953 | Ferguson et al. | 198—31.A2 |
| 3,051,292 | 8/1962 | Sundquist et al. | 198—31 |
| 3,153,471 | 10/1964 | Arnett | 198—31 |

FOREIGN PATENTS 765,013  1/1957  Great Britain.

EVON C. BLUNK, *Primary Examiner.*

M. L. AJEMAN, *Assistant Examiner.*